United States Patent
Peng

(10) Patent No.: US 8,496,487 B2
(45) Date of Patent: Jul. 30, 2013

(54) ELECTRONIC DEVICE WITH MEMORY CARD CONNECTOR

(75) Inventor: Da-Yi Peng, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/223,292

(22) Filed: Aug. 31, 2011

(65) Prior Publication Data

US 2013/0034981 A1 Feb. 7, 2013

(30) Foreign Application Priority Data

Aug. 1, 2011 (CN) .......................... 2011 1 0217735

(51) Int. Cl.
*H01R 13/44* (2006.01)
(52) U.S. Cl.
USPC .......................................................... 439/138
(58) Field of Classification Search
USPC ................ 439/138, 142, 131, 157, 159, 372; 361/679.02; 360/99.02
See application file for complete search history.

(56) References Cited

U.S. PATENT DOCUMENTS

| | | | |
|---|---|---|---|
| 5,701,216 A * | 12/1997 | Yamamoto et al. | 360/99.02 |
| 5,997,326 A * | 12/1999 | Koradia et al. | 439/160 |
| 6,038,125 A * | 3/2000 | Anzai | 361/609 |
| 6,377,451 B1 * | 4/2002 | Furuya | 361/679.32 |
| 6,506,065 B1 * | 1/2003 | Castleman | 439/157 |
| 7,639,477 B2 * | 12/2009 | Ikunami | 361/679.01 |
| 2005/0059281 A1 * | 3/2005 | Bricaud et al. | 439/188 |
| 2005/0257231 A1 * | 11/2005 | Hibi | 720/647 |
| 2007/0259570 A1 * | 11/2007 | Moshayedi | 439/638 |

* cited by examiner

*Primary Examiner* — Tulsidas C Patel
*Assistant Examiner* — Phuongchi T Nguyen
(74) *Attorney, Agent, or Firm* — Altis Law Group, Inc.

(57) ABSTRACT

An electronic device includes a housing, a card reader, and a cover. The housing includes a slot and two protrusions defined on the inner wall of the housing. The cover includes a body and two connection ends. The body is for covering the slot. The connection ends extend from the body. Each of the two connection ends includes a sliding slot which receives one of the two protrusions respectively to guide the two connection ends to slide. When the cover covers the card which contains a memory card therein, the cover is operable to be pressed to eject the memory card. When the memory card is ejected, it push the body of the cover to cause the two connection ends to slide along the two protrusions to make the body of the cover uncover the slot and rotate to expose the memory card.

5 Claims, 6 Drawing Sheets

ELECTRONIC DEVICE WITH MEMORY CARD CONNECTOR

BACKGROUND

1. Technical Field

The present disclosure relates to an electronic device capable of connecting an external memory card.

2. Description of Related Art

Some electronic devices include memory card slots for insertion of memory cards, such as SD cards, and TF cards. To save space, memory cards and their slots are made very small, and it can be difficult to grasp and remove a memory card from its slot.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
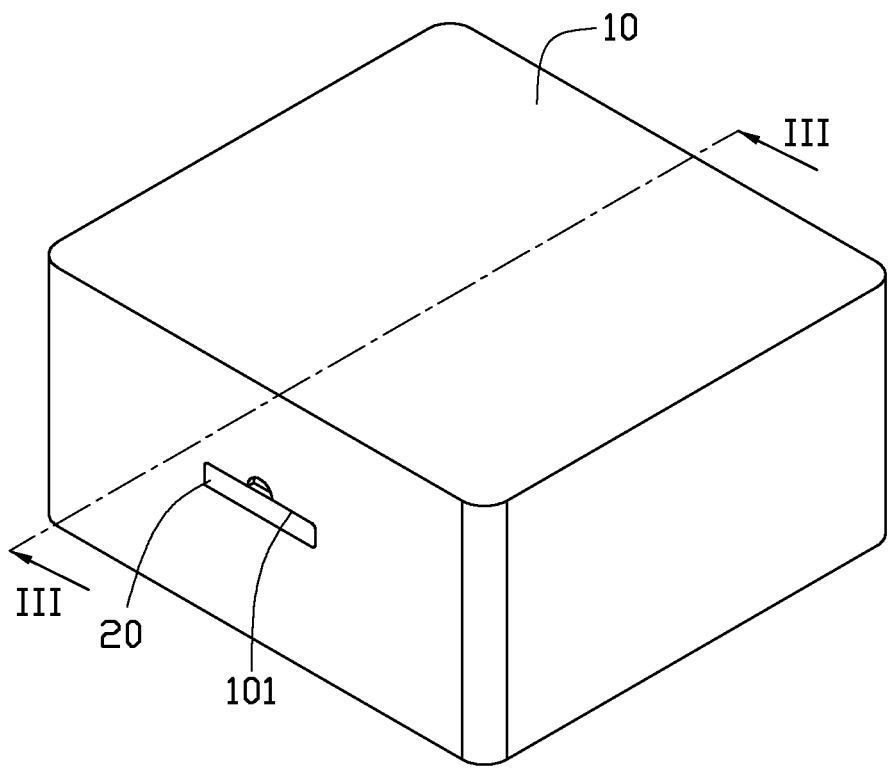
FIG. 1 is an isometric view of an electronic device with a covered card slot in accordance with an exemplary embodiment.
Figure 2:
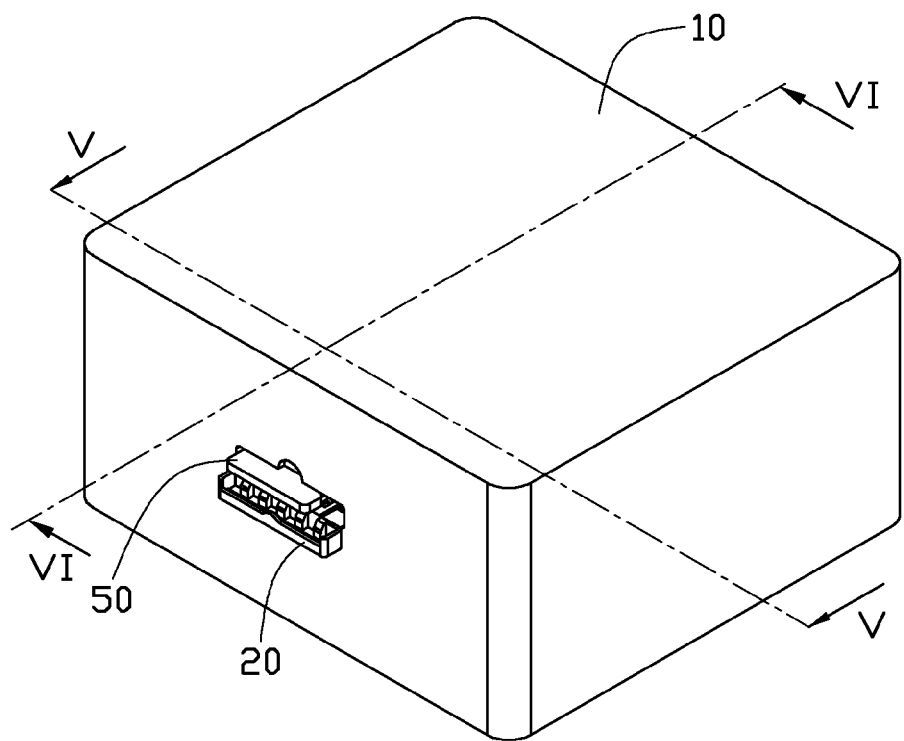
FIG. 2 is similar to FIG. 1, but showing the card slot uncovered.
Figure 3:
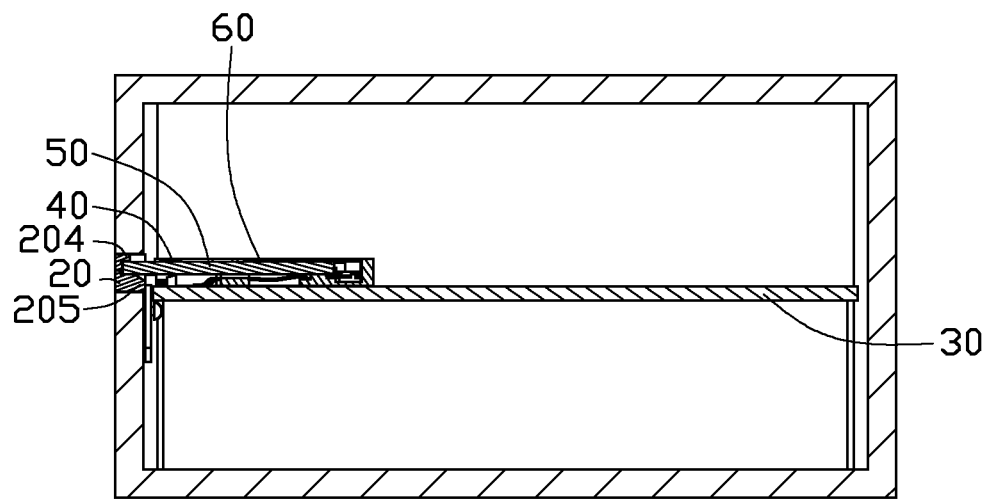
FIG. 3 is a cross-sectional perspective view taken along line III-III of FIG. 1.

Referring to FIGS. 1-3, an electronic device 1 includes a housing 10 and a cover 20. The housing 10 defines a slot 101. The cover 20 matches the slot 101 and is capable of covering the slot 101. The electronic device 1 further includes a processing unit 30 and a card reader 40. The processing unit 30 and the card reader 40 are placed inside the housing 10. The processing unit 30 connects with the card reader 40. The card reader 40 and the slot 101 form a card slot 60 of the electronic device 1. When a memory card 50 is inserted into the card slot 60, the card reader 40 reads the data from the memory card 50 and transmits the read data to the processing unit 30 for processing.

Figure 4:
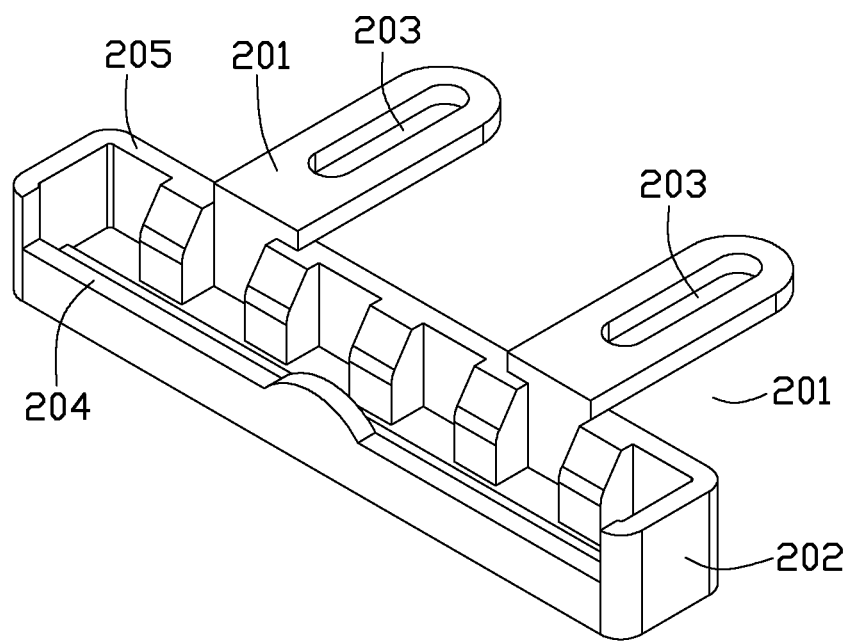
FIG. 4 is an isometric view of a card slot cover of the electronic device of FIG. 1.
Figure 5:
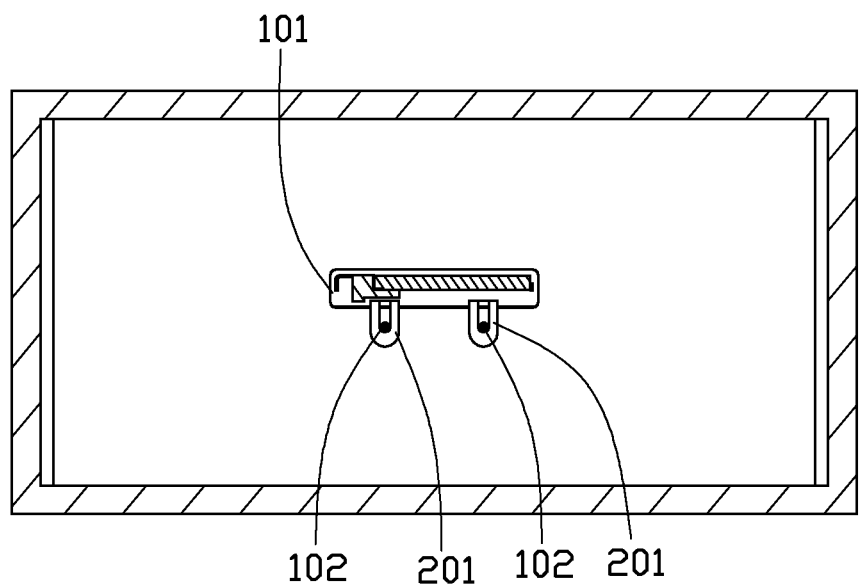
FIG. 5 is a cross-sectional perspective view taken along line V-V of FIG. 2.
Figure 6:
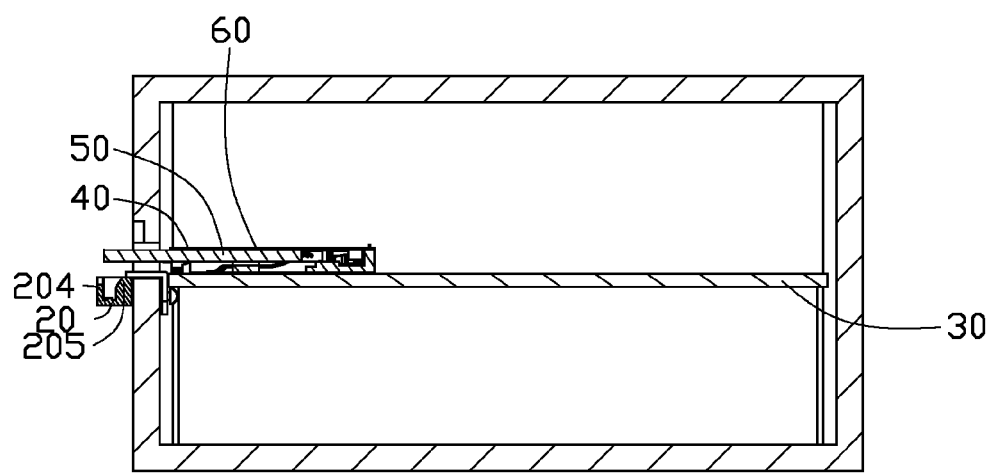
FIG. 6 is a cross-sectional perspective view taken along line VI-VI of FIG. 2.

Referring to FIGS. 4-6, the cover 20 includes at least one connection end 201 and a body 202. In the exemplary embodiment, two connection ends 201 are taken for example for ease of description. The two connection ends 201 extend from the body 202. Each of the ends 201 includes a sliding slot 203. The inner wall of the housing 10 defines two protrusions 102, which are respectively received in the sliding slots 203. Thereby, the cover 20 is connected to the housing 10. The ends 201 are elastic elements, made from a material such as elastomer. The body 202 is positioned outside of the housing 10 at the slot 101. The ends 201 can slide along the two protrusions 102 under an external force to open or close the body 20 and thus cover or uncover the slot 101.

The body 202 further includes a first stopper 204 and a second stopper 205. The first stopper 204 is shorter than the second stopper 205. The ends 201 extend from the second stopper 205. When the memory card 50 is inserted into the card slot 60 and the cover 20 closes to cover the card slot 60, the memory card 50 is sandwiched between the first stopper 204 and the second stopper 205. When the body 202 is pressed, it forces the memory card 50 to extend further into the card slot 60 and then the memory card 50 is ejected by the card reader 40. The distance the memory card 50 travels when being ejected is greater than the maximum distance of the two connection ends 201 can slide guided by the two protrusions 102, and due to the first stopper 204 being shorter than the second stopper 205, and a pulling force to the body 202 is generated by the ends 201 meanwhile the body 202 is pushed out by the memory card 50. The body 202 thus rotates around the memory card 50 in counter-clockwise to disengage the body 202 from the memory card 50. Thereby, the memory card 50 can be pulled out from the card slot 60 by the user.

In this exemplary embodiment, a groove 103 is defined above the slot 101 to allow a user to pry open the cover 101 when no memory card 50 is in the slot 60.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. An electronic device comprising:
  a housing comprising a slot and at least one protrusion defined on the inner wall of the housing;
  a card reader, placed inside the housing, forming a card slot with the slot;
  a cover comprising
    a body configured for covering the slot, and the body comprising a first stopper and a second stopper, wherein the first stopper is shorter than the second stopper; and
    at least one connection end extending from the body, each of the at least one connection end comprising a sliding slot which receives one of the at least one protrusion respectively to guide the at least one connection end to slide;
  wherein, when the memory card is inserted into the card slot, the body of the cover covers the slot and the cover covers the card reader, the memory card is sandwiched between the first stopper and the second stopper, the memory card pushes the body of the cover to cause the at least one protrusion to be sliding along a sliding slot of the connection end to make the body of the cover uncover the slot and rotate to expose the memory card.

2. The electronic device as described in claim 1, wherein, the body of the cover causes the memory card to be ejected by the card reader to travel a first distance, which is longer than a second distance of which the protrusion slides along a sliding slot of the connection end, due to the first stopper being short than the second stopper and a pulling force to the body is generated by the at least one connection end while the body is pushed by the memory card, the body rotates to expose the memory card.

3. The electronic device as described in claim 2, wherein a groove is defined above the slot to allow a user to pry open the cover when no memory card is in the slot.

4. The electronic device as described in claim 2, wherein each of the at least one connection end is an elastic element.

5. The electronic device as described in claim 2, wherein the number of the at least one connection end is two and number of the at least one protrusion is two.

* * * * *